(12) United States Patent
Greve (10) Patent No.: US 7,712,202 B2
(45) Date of Patent: *May 11, 2010

(54) RETORT BASKET SECURING SYSTEM

(75) Inventor: Christopher G. Greve, Covington, LA (US)

(73) Assignee: Allpax Products LLC, Covington, LA (US)

(*) Notice: Subject to any disclaimer, the term of this patent is extended or adjusted under 35 U.S.C. 154(b) by 104 days.

This patent is subject to a terminal disclaimer.

(21) Appl. No.: 11/840,589

(22) Filed: Aug. 17, 2007

(65) Prior Publication Data

US 2008/0000067 A1 Jan. 3, 2008

Related U.S. Application Data

(63) Continuation of application No. 11/018,286, filed on Dec. 20, 2004, now Pat. No. 7,275,480.

(51) Int. Cl.
*B21D 39/00* (2006.01)
*A47J 27/18* (2006.01)
*A61L 2/00* (2006.01)

(52) U.S. Cl. .................. 29/522.1; 29/454; 99/369; 99/371; 414/766; 100/269.04

(58) Field of Classification Search .............. 99/369, 99/371, 359, 349; 100/219, 211, 194, 195, 100/196, 208, 269.01, 269.02, 269.04; 422/297, 422/306; 414/766; 29/522.1, 559, 446, 454; 269/22, 287

See application file for complete search history.

(56) References Cited

U.S. PATENT DOCUMENTS 2,522,659 A * 9/1950 Anderson ............... 269/24
2,979,246 A * 4/1961 Liebeskind ............. 206/523
3,429,456 A * 2/1969 Burgher ................ 414/766
3,775,842 A * 12/1973 Sheldon et al. .......... 29/606
5,676,047 A   10/1997 Planck, Jr. et al.
5,687,639 A   11/1997 Planck, Jr. et al.
5,705,127 A   1/1998 Planck, Jr. et al.
5,732,622 A   3/1998 Lauderbauth
5,862,747 A   1/1999 Handel (Continued)

FOREIGN PATENT DOCUMENTS

FR     2567385       6/1983

(Continued)

*Primary Examiner*—Essama Omgba
(74) *Attorney, Agent, or Firm*—Thompson Hine LLP (57) ABSTRACT

A system for securing a basket containing product securely within an autoclave or retort. The preferred embodiment of the present invention is used with rotational retorts, which generally include a rotational insert for receiving product-loaded baskets, the rotational insert rotated via a drive to rotate the baskets end over end during the autoclave process, for more efficient heat transfer. The present invention contemplates an improvement for securing the baskets within the retort, to facilitate secure rotation of the baskets and their contents, and prevent shifting of the baskets within the retort during rotation. Particularly, the preferred embodiment of the present invention contemplates the use of one or more lift bladders sandwiched between clamping platens situated along the length of the rotational insert, the lift bladders configured to expand to lift and position the baskets into a securing position for rotation, then deflate to release the baskets after processing for removal.

11 Claims, 10 Drawing Sheets

U.S. PATENT DOCUMENTS

| | | |
|---|---|---|
| 6,009,800 A | 1/2000 | Planck, Jr. et al. |
| 7,104,186 B2 * | 9/2006 | Persoons .................... 99/371 |
| 7,275,480 B2 * | 10/2007 | Greve ........................ 99/369 |
| 7,331,583 B1 * | 2/2008 | Andre ...................... 279/4.03 |
| 7,380,978 B2 * | 6/2008 | Damhuis ................. 366/175.3 |
| 2004/0079669 A1 | 4/2004 | Persoons |
| 2006/0130667 A1 | 6/2006 | Greve |

FOREIGN PATENT DOCUMENTS

| | | |
|---|---|---|
| FR | 2567385 | 1/1986 |

* cited by examiner

RETORT BASKET SECURING SYSTEM

CROSS-REFERENCE TO RELATED APPLICATIONS

This application is a continuation of and claims priority to U.S. application Ser. No. 11/018,286, filed Dec. 20, 2004, issued as U.S. Pat. No. 7,275,480.

TECHNICAL FIELD OF THE INVENTION

The present invention relates to clamping devices for use in sterilization autoclaves (known in the industry as retorts), and in particular to a system for securing a basket or series of baskets containing product securely within a retort.

The preferred embodiment of the present invention is used with rotational retorts, which generally include a rotational insert for receiving product-loaded baskets, the rotational insert rotated via a drive to rotate the baskets end over end during the autoclave process, for more efficient heat transfer to the product.

The present invention contemplates an improvement for securing the baskets within the retort, to facilitate secure rotation or other repositioning of the baskets and their contents, and prevent shifting of the baskets within the retort during rotation or repositioning.

The improvement in the present invention lies in the utilization of a new and unique bladder system for securely repositioning and supporting the baskets within the retort, particularly within the rotational insert or the, effectively clamping same to the insert during the autoclave process.

Particularly, the preferred embodiment of the present invention contemplates the use of one or more bladders juxtaposed between upper and lower clamping platens situated along the length of the rotational insert, the bladder configured to receive fluid (such as, for example, compressed air) under pressure so as to expand to lift and position the baskets into a securing position for rotation, then vent the fluid contents, so as to deflate to release the baskets after processing for removal.

BACKGROUND OF THE INVENTION

With the utilization of rotational retorts or the like, some securing means is generally required to secure the baskets situated therein to prevent shifting of the basket within the retort during rotation.

Ideally, a loaded basket should be able to be placed into the retort and rotated during treatment (or otherwise moved) in a series of smoothly executed movements without undue jarring or uncontrolled contact.

Even a small movement between the basket and the retort (or rotational insert where one is used) results in continuous wear and tear on the basket and retort, strain on the drive system due to inconsistent forces associated with the movement of the basket(s) (each loaded basket can weigh in excess of 4000 lbs), and potential damage to the product situated within the baskets.

Prior art patents such as U.S. Pat. No. 5,676,047 entitled "Rotating Variable Height Clamping Device" issued Oct. 14, 1997 is an example of a clamping mechanism formed to engage and clamp a stack loaded into the retort. A moveable "top member" is provided to be raised and lowered to engage the stack. However, such mechanical configurations are expensive to provide and maintain, and are prone to breakage due to the extreme operating environment caused by high temperatures under pressurized conditions, high operating cycles and high weights associated with the stack. Further, the nature of the actuator requires that it be fabricated of expensive materials due to the extreme operating environment.

Further, the prior art actuators are required to be operable on a rotating mechanism, which further complicates its design and propensity for breakdown. In the '047 device, the stack is secured via actuators at the top and bottom of the stack only; accordingly, there remains clearance at the sides of the basket, which can result in slippage and shifting of the stack and its contents.

Typically, air cylinders were employed in prior systems, so as to actuate plates located above the baskets in the insert, clamping against opposing small bearing transfer rollers. This design had a tendency to put a point load on the center of the basket, which provides uneven pressure across the basket. It is believed that no side actuators where provided, so generally the product shifted slightly during the treatment process.

Another shortcoming of the prior art actuators is they provided only point to point contact with the baskets, providing pressure to only a portion of the basket, resulting in uneven pressure, which not only stresses the basket, but also increases the likelihood of movement of the basket even when clamped, thereby resulting in shifting of the materials which further stresses the basket structure and rotational insert, as well as rotational drive mechanism, while potentially damaging the materials therein.

There is accordingly a need in the industry for a system for providing a secure clamping arrangement to loaded baskets within a retort which is reliable in operation, relatively cost effective to implement and maintain, and which can handle the extreme operating environment and high duty cycle of an industrial retort operation.

GENERAL SUMMARY DISCUSSION OF THE INVENTION

Unlike the prior art, the present invention provides a system for clamping a loaded retort basket or series of baskets within a retort in a manner which is more reliable in operation at a lesser cost to implement and maintain, while being more durable than prior art systems.

Further, the present invention provides a lifting system which is effective in the harsh operating environment of a rotational retort, which entails a heated water bath, severe movement, heavy loads, in a high duty cycle.

As indicated supra, the present invention contemplates an improvement for securing the baskets within the retort, to facilitate secure rotation or other repositioning of the baskets and their contents, and prevent shifting of the baskets within the retort during rotation or repositioning.

As will be shown, one or more independent bladder lifting systems are provided for securely repositioning and supporting the baskets within the retort, particularly within the rotational insert or the retort itself, so as to effectively engage said basket and contents to the rotational insert (or, in other designs, the retort itself) during the autoclave process.

The preferred embodiment of the present invention contemplates the use of one or more bladders juxtaposed between upper and lower clamping platens situated along the length of the rotational insert, the bladder configured to receive fluid (such as, for example, compressed air) under pressure so as to expand to separate the platens and position the baskets into a securing position for rotation during treatment, then, upon completion of the treatment cycle, vent the fluid contents, so as to deflate to release the basket(s) after processing for removal.

The bladders of the preferred embodiment of the present invention are formed of high temperature material, and are configured to expand to a provide an effective range of stroke in the actuator to provide substantial potential clamping force. The bladders are expanded by filling same with compressed air, so that the higher the air pressure, the more force applied. Alternatively, another fluid such as water could be utilized. The silicone bladders of the preferred embodiment of the present invention are able to withstand the 300 degrees fahrenheit temperature, and up to 60 psi of external pressure generated by the pressure in the retort.

In the preferred embodiment, the present bladder-actuated devices lift the filled basket vertically to clamp the basket to an opposing fixed platen, to eliminate movement on one axis, and two separate bladder-actuated systems engage the basket horizontally against an opposing fixed platen, to eliminate movement on the other axis lateral to the first.

Custom machined fittings at each end of each bladder allow air pressure to be quickly and efficiently supplied to the system, and spring bias means and a pressure rail situated along the length of each of the the upper and lower platens sandwiching each bladder are used to deflate each bladder, to quickly create clearance for basket removal when the lifting/clamping cycle is completed, in the preferred embodiment.

The system of the present invention thereby applies pressure to the baskets to secure same, utilizing fluid pressure to lift the baskets off of the transfer rollers in the base of the unit to eliminate premature wear, while providing evenly distributed force through the bladders which provide support along the length of the basket, preventing shifting of the baskets and its contents during rotation or other movement during processing.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Referring to FIGS. 1, 2, 8 and 9 of the drawings, the system S of the exemplary embodiment of the present invention is shown implemented in conjunction with a water immersion retort 1 wherein there is provided an upper, pre-heat water storage vessel 2 and a lower process vessel 3, although it is noted that the basket positioning/clamping system of the present invention may be utilized with other types of retorts and product treatment devices.

In the exemplary embodiment of the Figures, the water immersion retort is also a rotational retort, having a rotational insert 4 situated within the cylindrical cavity formed within the process vessel 3, the rotational insert 4 rotated 5 by a drive mechanism 6 during processing. The rotational insert 4 may included support wheels 7 for engaging the inner cylindrical wall of the process vessel 3, for supporting the insert and a load for end over end rotation within the cylindrical inner wall of said vessel.

Figure 1:
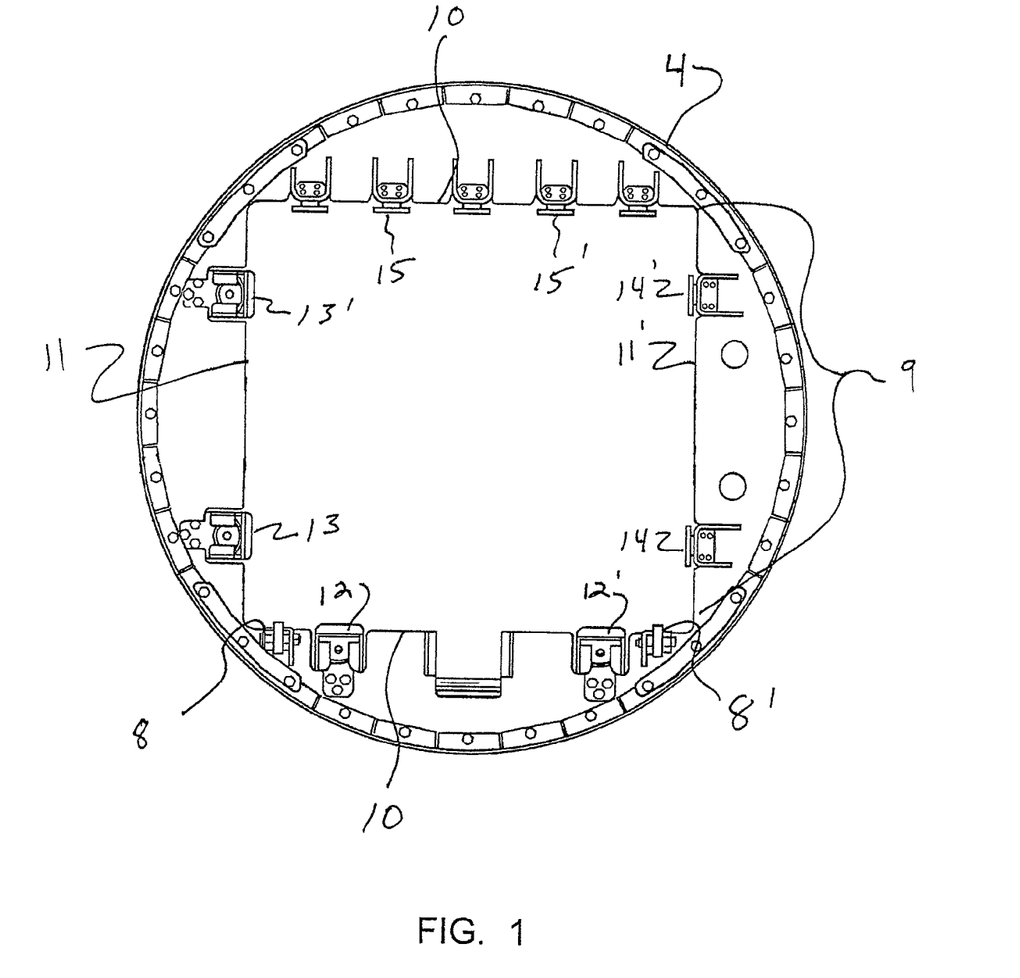
FIG. 1 is a front view of the preferred embodiment of the basket securing system of the present invention, illustrating the rotational insert having a basket passage formed therethrough wherein the baskets are inserted, the basket securing devices situated on one side and bottom of said passage, and stationary platens at the top and other side of the passage.
Figure 2:
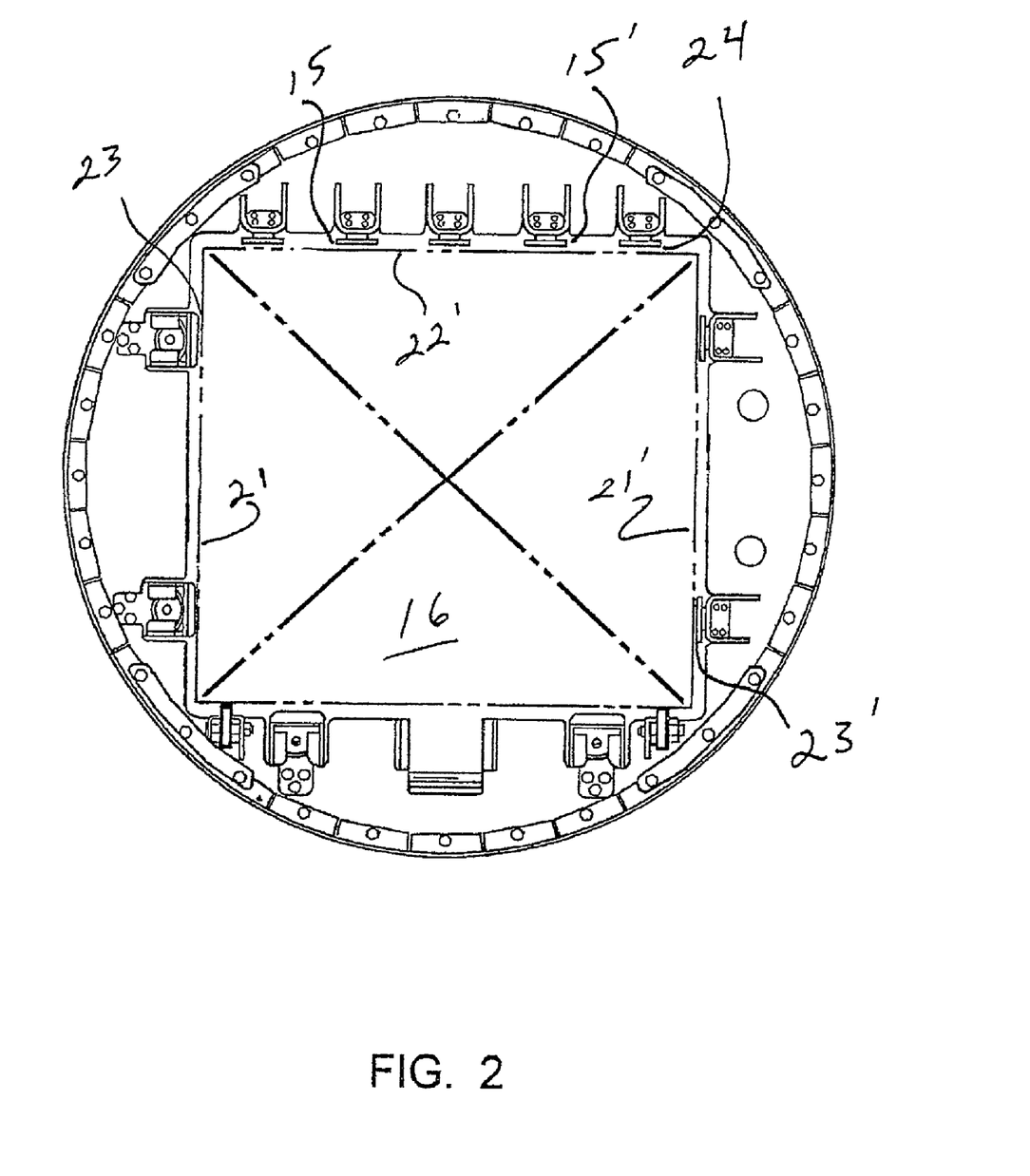
FIG. 2 is a front view of the embodiment of FIG. 1, illustrating an outline of a basket situated therein, with the basket securing devices in an uninflated configuration.

In the exemplary embodiment of the present invention, the rotational insert 4 has formed therein a basket receiving area 9 having bottom 10, top 10', and first 11 and second 11' side supporting edges formed to receive a basket 16 filled with product for processing within the retort.

Figure 8:
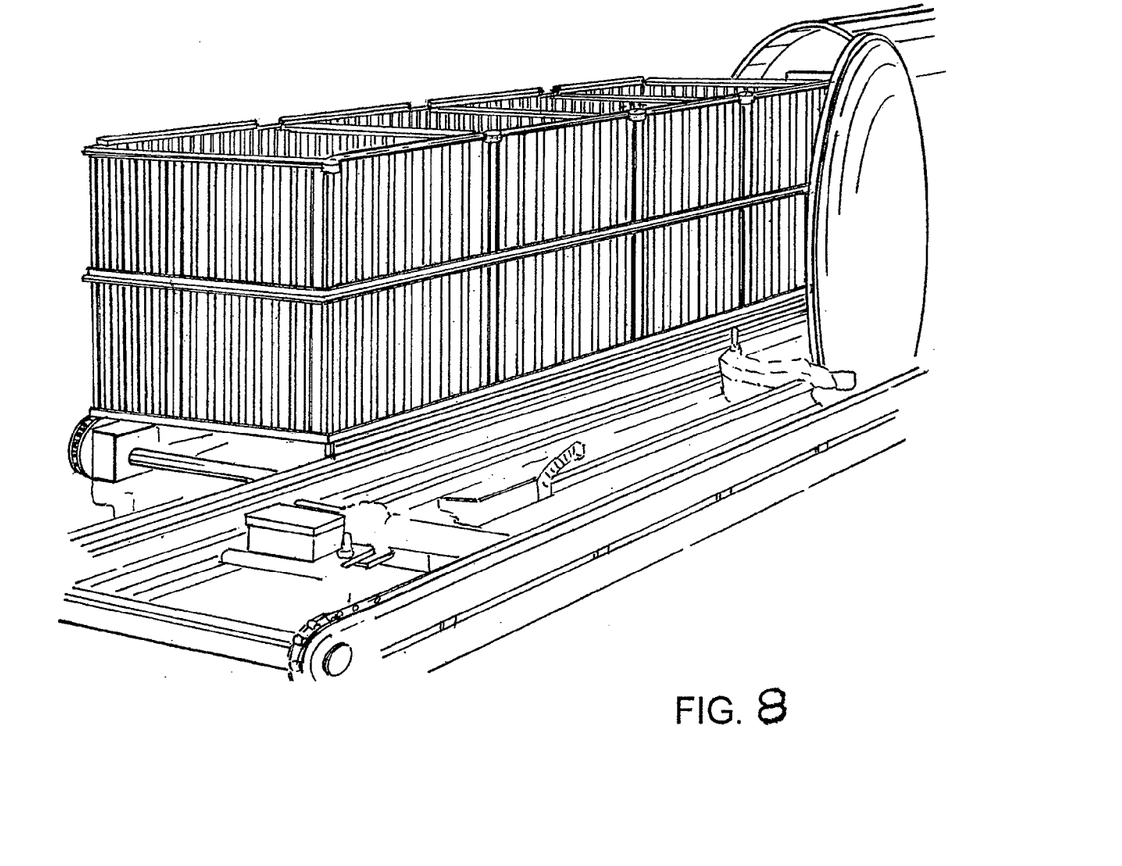
FIG. 8 is an isometric view of a series of baskets on a shuttle being loaded to a revolving retort.
Figure 9:
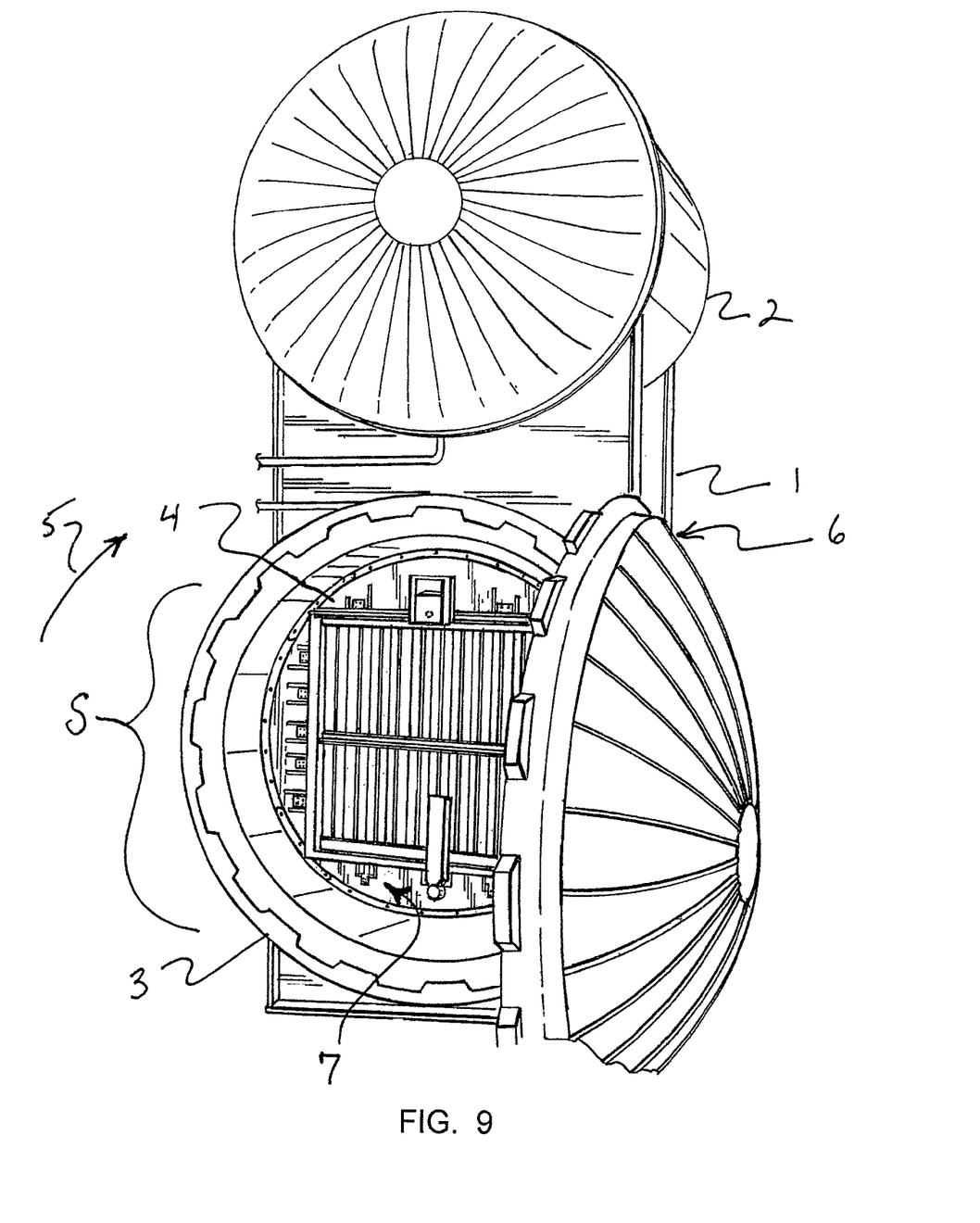
FIG. 9 is an end view of a water immersion, revolving retort having a retort insert with the basket securing device of the present invention.

Generally, a basket 16, or baskets 16' in series, are loaded in the rotational insert 4 of the process vessel 3 via an automated shuttle or the like, which urges the baskets into the basket receiving area of the rotational insert, then, after processing, retrieves same. First 8 and second 8' bearing transfer rollers are provided along the bottom edge of the basket receiving area 9, to support and guide the baskets on their ingress and egress into and out of the rotational insert, respectively.

To prevent shifting of the basket within the retort during rotation of same, there are provided along the bottom edge 10 of the basket receiving area of the rotational retort first 12 and second 12' bottom actuators situated generally equidistant from the center of the bottom edge 10, and first 13 and second 13' side actuators situated at the first side edge 11 of the basket receiving area of the rotational retort.

In the preferred embodiment of the present invention, each basket contains layers of shelves, each shelf containing product to be processed.

Situated opposite the bottom 12, 12' and side 13, 13' actuators are top 15, 15' and side 14, 14' stationary platens, respectively, configured to engage the top and side wall of the basket when positioned by the bottom and side actuators, as will be discussed further infra.

In the exemplary, working embodiment of the present invention, when loaded into the basket receiving area 9 of the rotational insert 4, there is only about ½" clearance 23, 23' between each of the basket sidewalls 21, 21' and the side edge 11 and stationary platens 14, 14' of the basket receiving area of the rotational retort (1" total horizontal clearance), and only about an inch (1") vertical clearance 24 between the top 22' of the basket and the top stationary platens 15, 15' of the rotational insert.

Figure 3:
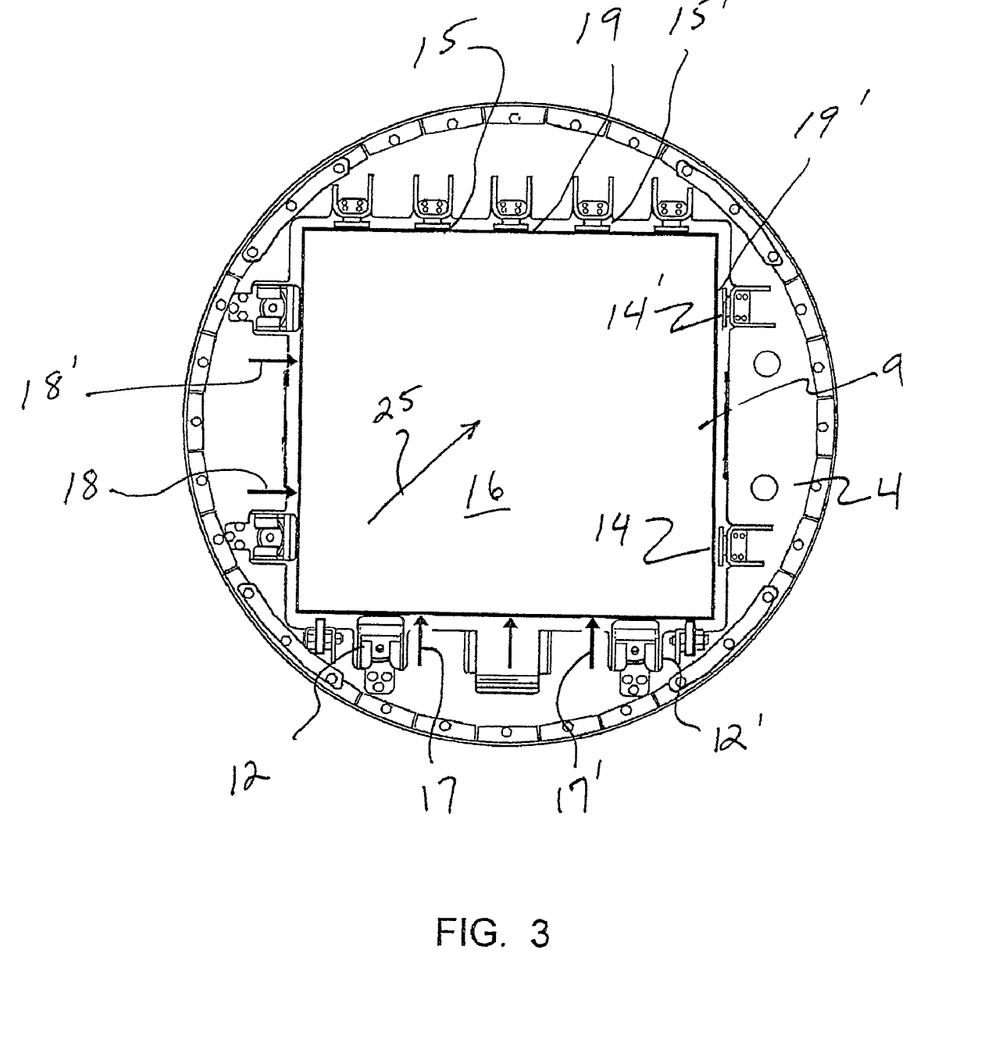
FIG. 3 is a front view of the embodiment of FIG. 2, illustrating an outline of a basket situated therein, with the basket securing devices in an inflated condition, lifting and the basket upward and pushing it sideways to isolate same against opposing stationary platens.

To position the basket 16 (or series of baskets), bottom 12, 12' and side 13, 13' actuators are engaged, preferably simultaneously, to lift 17, 17' and horizontally position 18, 18' the basket 16, in a generally diagonal direction toward the upper right hand corner of the basket receiving area, or the upper right hand quadrant of the retort, so that, preferably, the upper 15, 15' and side 14, 14' stationary platens engage 19, 19' the top 22' and side 21' of the basket, respectively, at about the same time, so that the basket(s) are firmly situated within the retort insert during processing.

Alternatively, the bottom 12, 12' and side 13, 13' actuators can be actuated sequentially, depending upon the application, which will likewise result in sequential engagement of the upper 15, 15' and side 14, 14' stationary platens. Either way, the basket(s) are firmly situated within the rotational insert, and will not shift or move in an unintended fashion during rotating or other repositioning during processing.

After reprocessing, the actuators are disengaged to release the basket within the rotational insert to allow them to be removed from the retort, so that another basket or load of baskets may be loaded, and the process repeated.

Referring to FIGS. 3, 4, 5, 6, 7, and 10, the actuator 30 has first 32 and second 32' ends, a length 31, and is formed by a series of longitudinally aligned upper platens 28, 28' and lower platens 29, 29' with an elongated bladder 27 situated therebetween. The actuators are configured so that inflation of the bladder lifts or horizontally positions (depending upon its position) the upper platen, as well as any basket(s) situated thereupon (riding upon the upper platen support surface 33). Venting the bladder deflates it, lowering/removing pressure on the upper platen, easing the pressure on the baskets so that it no longer engages the opposing stationary platens. Ideally, the actuator's length 31 in the preferred embodiment is commensurate with the length of the rotational insert upon which it is installed, so as to uniformly reposition those basket(s) loaded into the basket receiving area 9 of the rotational insert 4.

Figure 4:
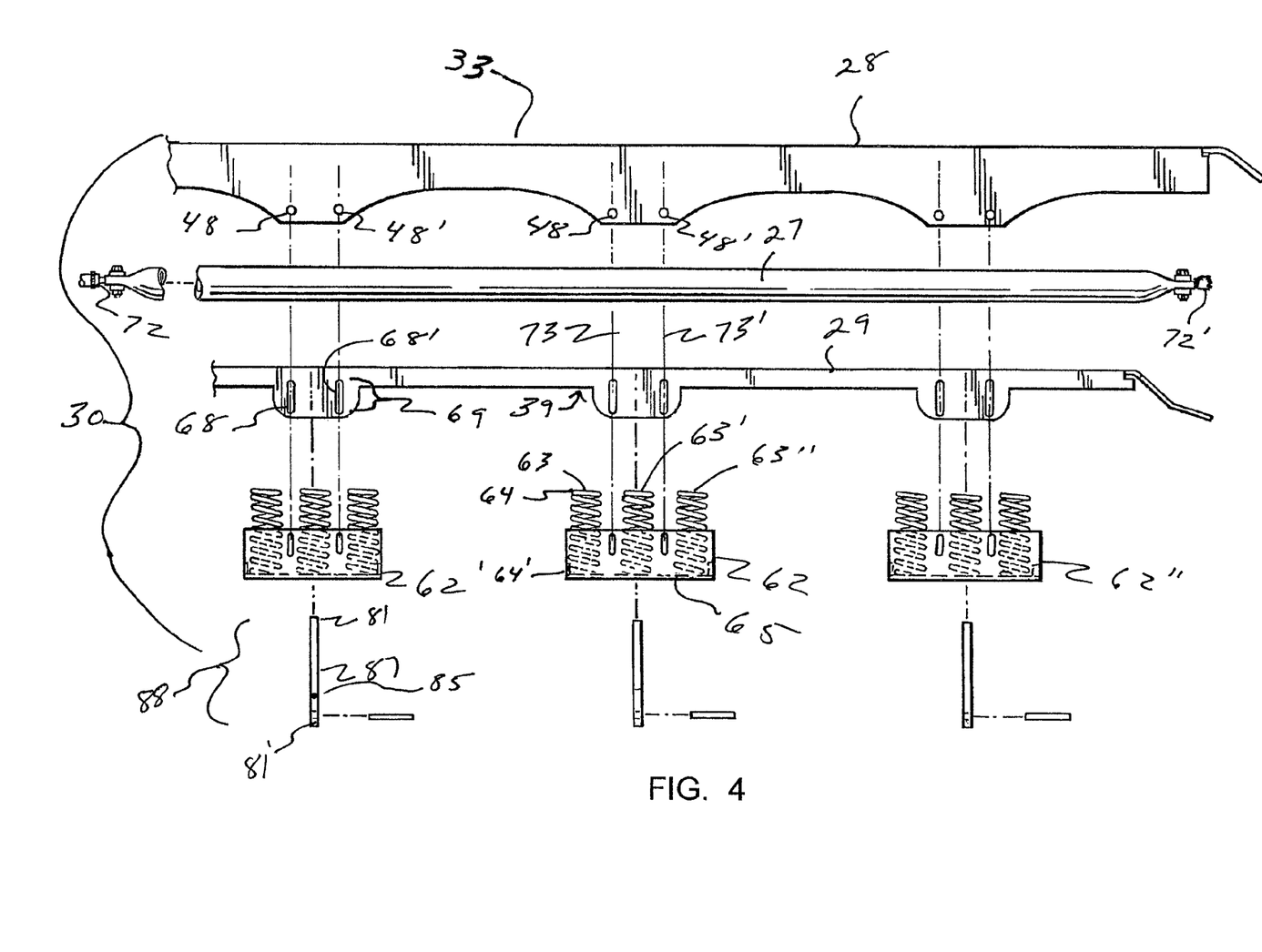
FIG. 4 is a side, partial, exploded view of a basket securing device of FIG. 1, indicating the various components associated therewith.
Figures 10, 11:
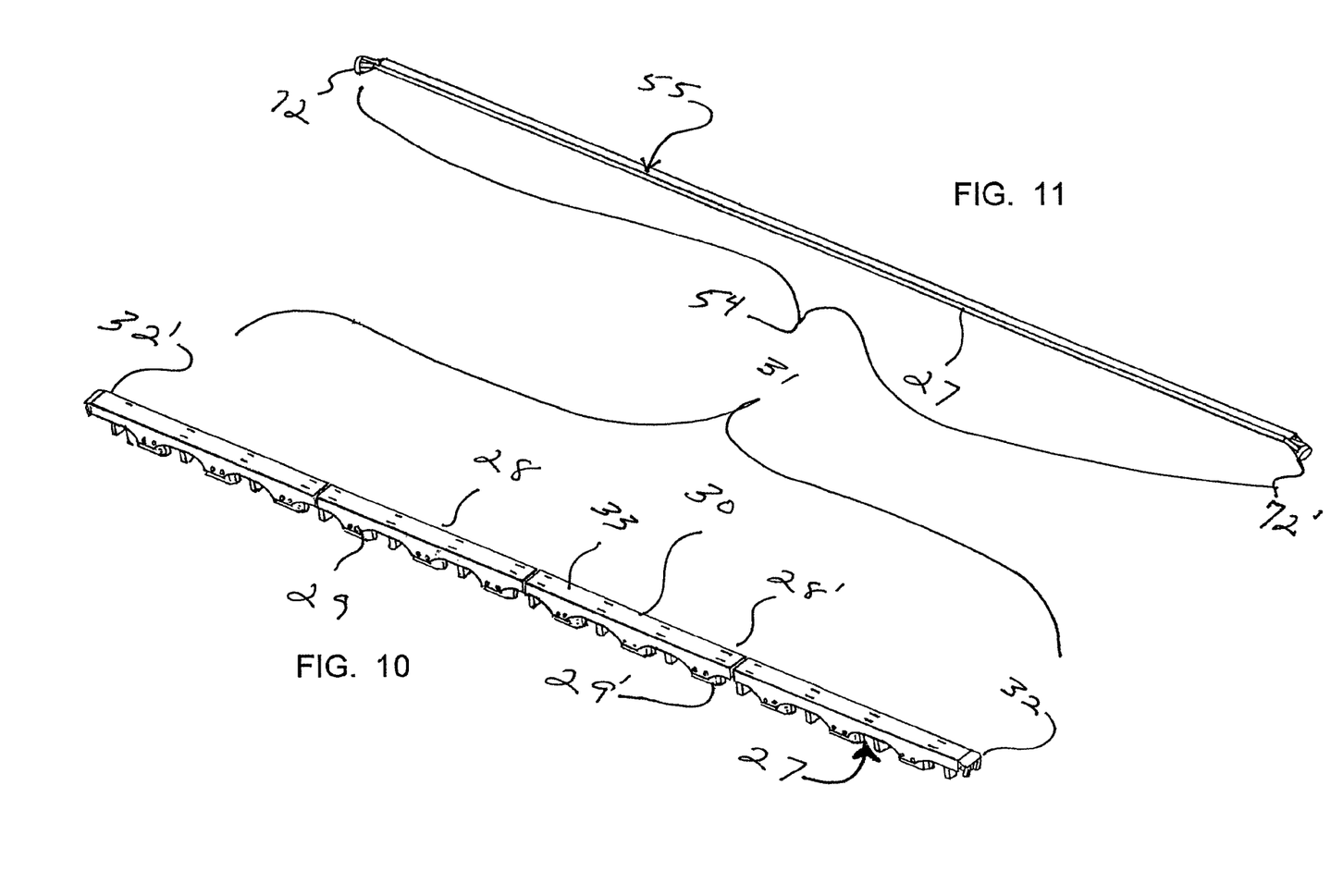
FIG. 10 is an isometric view of the upper and lower platens forming components of the basket securing device of the present invention.
FIG. 11 is an isometric view of the bladder forming a component of the basket securing device of the present invention.

Each upper platen 28 is formed of a relatively strong and rigid material such as, for example, stainless steel, and includes an upper support surface 33, an underside 36, first 34 and second 34' edges having first 35, and second 35' lateral sidewalls emanating at a like right angle away from the underside 36 to form a uniform width 37 therebetween, so as to envelope 50 bladder 27 therebetween. A compression rail 90 emanates from the underside 36 of the upper platen along its length to apply pressure to the bladder 27, so as to fully deflate and empty 56' same when vented.

Forming a supporting floor for the bladder 27, and enveloped by the first 35 and second 35' lateral sidewalls of the upper platen 28 is lower platen 29, having an upper support surface 61 and first 60 and second 60', downwardly laterally emanating side walls, the upper surface 61 of lower platen 29, in combination with the upper platen 28 with its first 36 and second 35' sidewalls, forming a compartment 51 wherein bladder 27 is contained.

As shown, the first 35 and second 35' lateral sidewalls of the upper platen 28 envelope the first 60 and second 60' lateral sidewalls of the lower platen in parallel fashion, and at predetermined intervals along the length of lateral sidewalls 35, 35' there is formed first 48 and second 48' pin apertures therethrough in aligned fashion.

Figure 5:
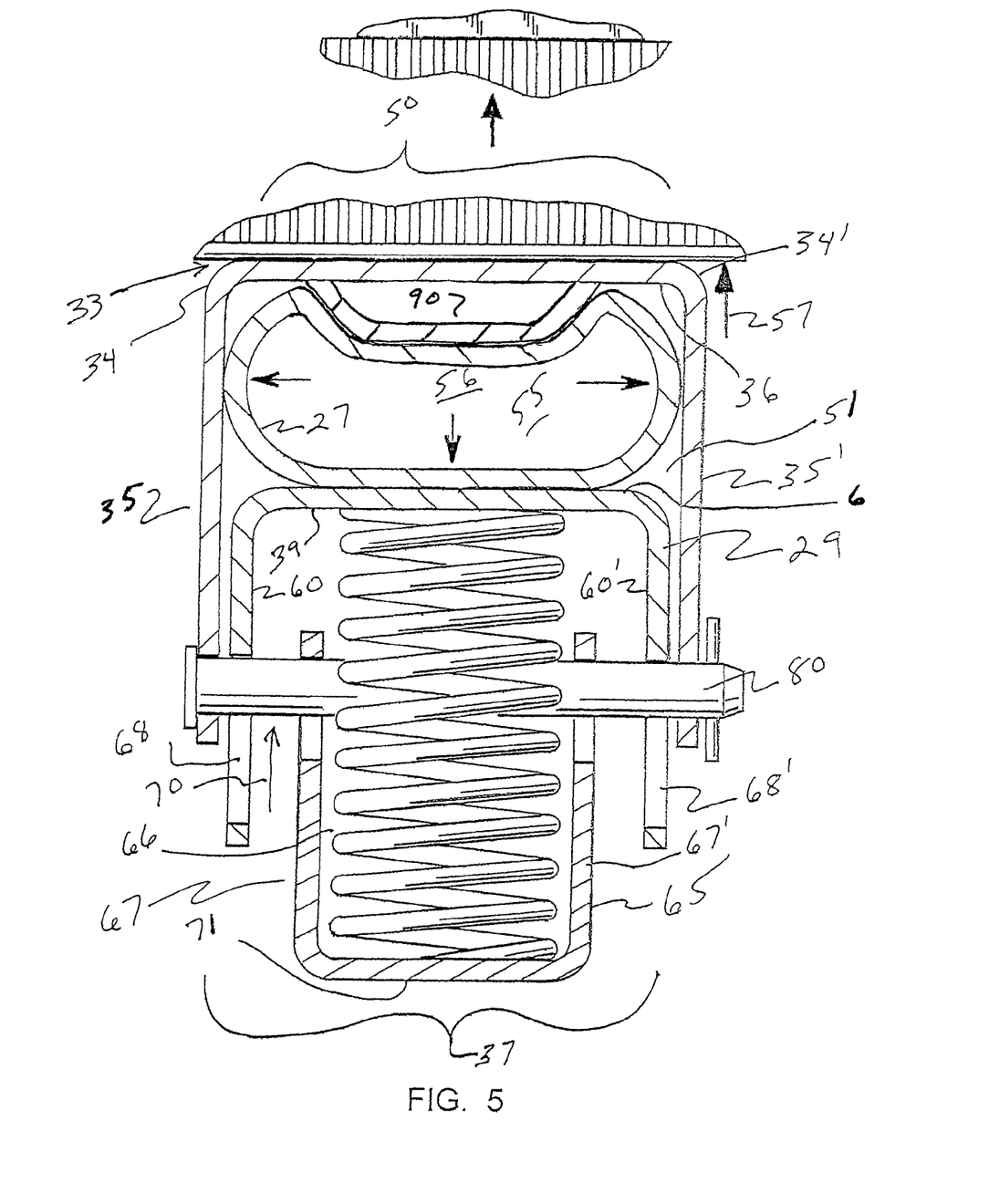
FIG. 5 is an end, partially cut-away view of the basket securing device of FIG. 4 in an assembled configuration, illustrating the bladder in an inflated condition.

Similarly, lateral sidewalls 60, 60' of lower platen have formed therethrough vertical slots 68, 68', which are aligned with apertures 48, 48' respectively, the apertures 48, 48' and slots 68, 68', respectively, are each laterally aligned, as shown in the Figures, each to receive a pin 80 therethrough, as shown in the figures (for example, FIG. 5).

Figure 6:
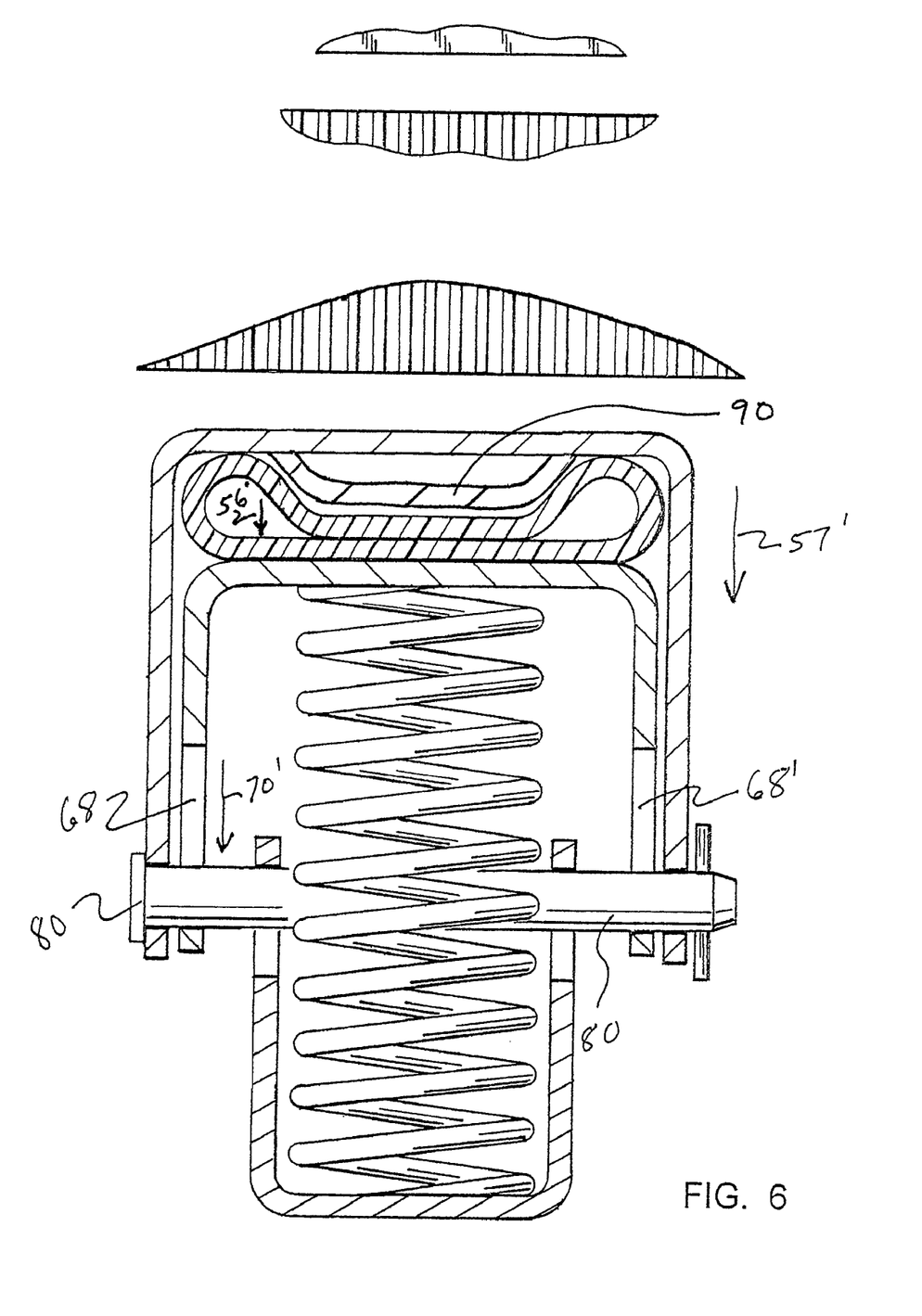
FIG. 6 is an end, partially cut-away view of the basket securing device of FIG. 5 in an assembled configuration, illustrating the bladder in a vented, un-inflated condition.

As shown, the vertical slots 68, 68' are formed with a length 69 and width to permit the pin to vertically slide toward 70 the bladder, the expanding bladder 27 urging the upper platen 28 away 57 from the lower platen, in an extended lifting or pushing configuration. Alternatively, the venting and subsequent contraction of bladder urges the pin 80 to vertically slide away 70' from the bladder 27, placing the actuator in a contracted configuration.

In the exemplary, working embodiment of the present invention, the bladder is formed of a hose comprising a fluid impermeable, flexible wall 53 of primarily silicone. In the present invention, the source was HBD INDUSTRIES, the hose being a 2½ inch (inner diameter) model 3003 silicone hose, having a 3/16" standard wall, 2⅞" outer diameter, an indicated working pressure of 38 PSI, and 150 PSI burst pressure, 0.94 lbs/ft, −67 to 347 degrees Fahrenheit operating temperature range. It has been found to lift/horizontally a load of baskets situated in series in the rotational insert with load of 4000 lbs each by filling the hoses within each actuator with about sixty (60) PSI of compressed air.

In the working, exemplary embodiment of the present invention, compressed air lines engage couplings 72, 72' at opposing ends of the hose to facilitate rapid inflation via compressed air from a compressor or the like, as well as rapid deflation by venting the air within the bladder, thereby forming a bladder comprising a fluid receiving enclosure 55 for driving the actuators.

Ideally, the hose forming the bladder has a length about the same as the length 31 of the platens forming the actuator, to facilitate uniform separation of the upper and lower platens along the actuators length.

The actuators of the present invention further include a bias apparatus 62 to urge the upper and lower platens together, to assist in lowering the upper template and evacuating or venting the bladder.

In the exemplary, working embodiment of the present invention, three bias apparatus 62, 62', 62" equally spaced from one another along the length of the actuator are employed, each unit engaging the sidewalls 48, 48' of the upper platen via respective sets of pins 80, 80' and passing through the sidewalls of the lower platen via slots 68, 68', respectively.

As shown, each bias apparatus 62 comprises first 63, second 63', and third 63" springs having first 64 and second 64' ends, the first end 64 engaging the underside 39 of the lower platen 29, the second end 64' engaging a spring housing 65 having a lower base 71 (which engages the second end 64' of the spring, with first and second lateral sidewalls 67, 67' emanating from opposing sides to form a spring compartment 66 therebetween.

As shown, each of the sidewalls 67, 67' forming each spring housing 65 have pin slots 68, 68' aligned 73, 73' with slots 68, 68' which allows sets of pings 80, 80' to engage upper platen sidewall apertures 48, 48' and slidingly traverse the respective slots of the lower platen 28 and bias apparatus 62, such that expansion of bladder 27 lifts upper platen 28, compressing springs 63, 63', 63", and upon contraction of bladder 27, springs 63, 63', 63" provide bias to urge the upper platen towards lower platen, applying pressure to further deflate bladder, facilitating quicker venting of bladder 27, and retracting the actuator. As earlier indicated, the compression rail 90 emanates from the underside of the upper platen to apply pressure to the bladder 27, so as to fully deflate and empty 56' same as the upper platen retracts toward the lower platen. Like the upper and lower platens, the compression rail may be formed of stainless steel plate or the like.

Figure 7:
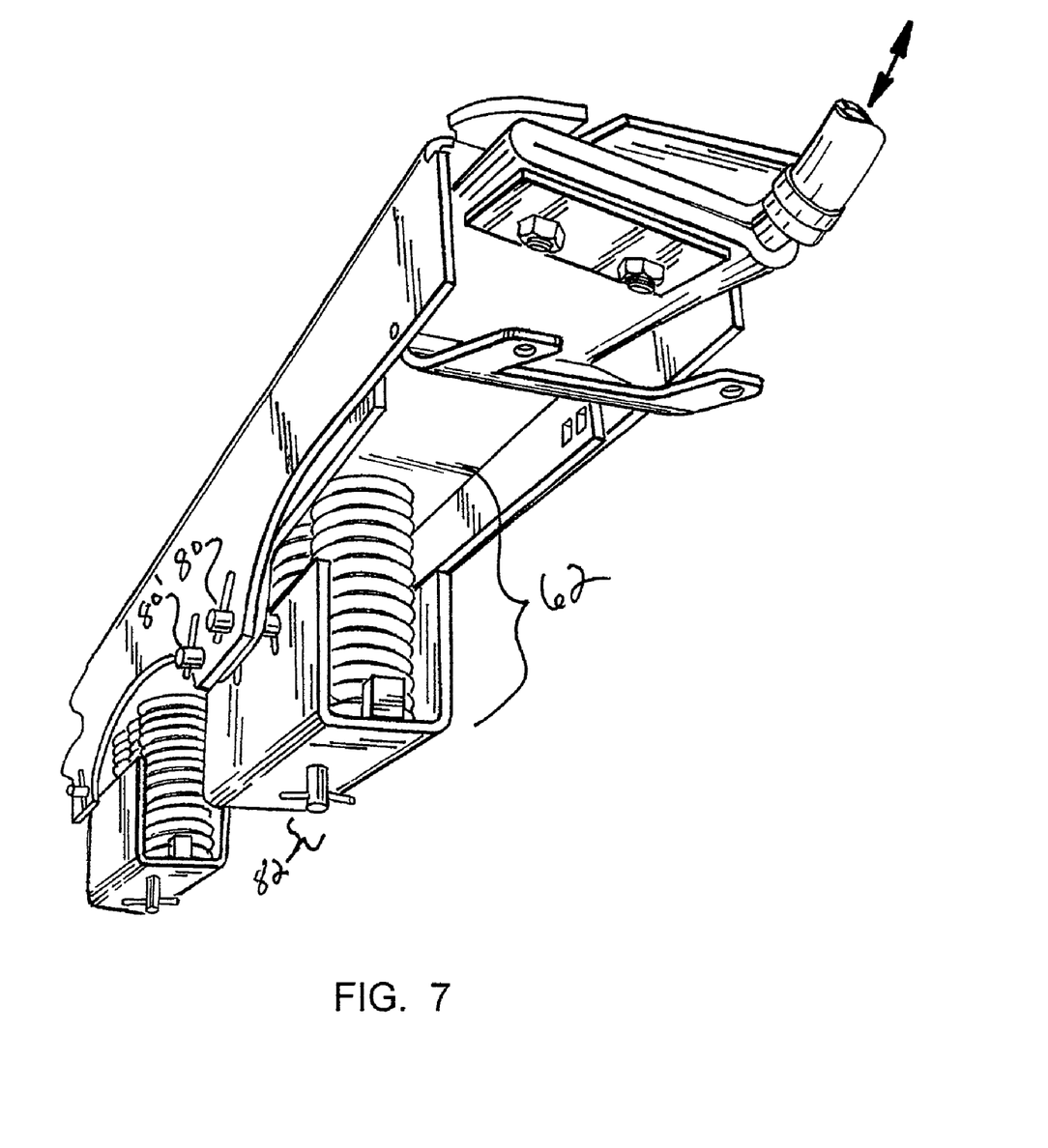
FIG. 7 is an isometric view of the basket securing device of FIG. 7, illustrating the bladder in an un-inflated condition.

Referring to FIGS. 4 and 7, a locking pin is provided to lock the bias means when installing or performing maintenance on the system. The locking pin 87 has first 81 and second 81' ends and a length 88, the first end 81 affixed to the underside 39 of the lower platen 29, the second end 81' emanating 82 from the spring enclosure 65. An aperture 85 is provided to so that a cotter pin or the like may be placed therethrough when spring enclosure 66 in the compressed position (i.e., when the bladder is inflated). Bias clamping pressure between the two platens upon the bladder is thereby relieved, so that the bladder can be serviced or other maintenance or repair can occur. Once the maintenance/repair operation is completed, the bladder is again filled with compressed air or the like, at which point the pin may be removed from aperture 85, freeing the spring enclosure from the locking position, and allowing same to apply clamping bias to facilitate collapse of the bladder 27 upon venting of same.

An exemplary method of using the present system may be summarized as follows:

a. Providing:
   a rotational insert situated in the retort having an edge defining a basket receiving area;
   a first actuator situated in the vicinity of said edge, said actuator comprising:
      a first platen;
      a second platen;
      a bladder situated between said first and second platen;
b) affixing said second platen to said insert;
c) positioning a basket containing product within said basket receiving area of said insert;
d) filling said bladder with fluid, so as to expand said bladder;
e) allowing said expanding bladder to direct said first platen away from said second platen, providing an extending actuator;
f) allowing said extending actuator to engage said basket and move said basket until there is no Clearance between said basket and said insert, and said basket can be moved no further, securing said basket;
g) ceasing filling said bladder with fluid, maintaining the existing fluid within said bladder;
h) moving said insert, so as to move said basket within said retort, for a predetermined period of time;
i) draining said fluid from said bladder, so as to contract said bladder, which may include the additional step of utilizing bias means to draw said first and second platens together, squeezing said bladder, so as to facilitate the enhanced venting of fluid therefrom;
j) allowing said contracting bladder to facilitate said first platen being drawn toward said second platen, providing a contracting actuator;
k) allowing said contracting actuator to dis-engage said basket, releasing said basket
l) removing said basket from said insert
m) repeating steps c-h.

It is reiterated that such terms as "basket", "rotational insert", "actuator", "platen", "retort" and the like are not intended to be limiting, but rather illustrative of the types of components which may be implemented in practicing the present invention. The term "basket" is intended to refer to any type of container or structure for supporting product, "rotational insert" refers to any type of supporting frame situated within said retort that is used by the retort to support said basket, "platen" is intended to refer to any type of support member, and "retort" can mean various devices for processing a product within a containment area, including autoclaves, sterilizers, retorts, and the like, whether for treatment of foods, pharmaceuticals, as well as sterilization or treatment of non-consumable product(s).

While the present system was illustrated as being utilized with a rotational, water immersion-type retort, the improvement of the present system is equally suited with stationary retorts, steam retorts, autoclaves, and like systems which require securing of product during the treatment process.

ELEMENTS of the Invention

| Element | Description |
|---|---|
| S | System |
| 1 | Water immersion retort |
| 2 | Upper, pre-heat water storage vessel |
| 3 | Lower process vessel |
| 4 | Rotational Insert |
| 5 | Rotated |
| 6 | Drive |
| 7 | Support wheels for end over end rotation |
| 8,' | Bearing transfer rollers for shuttling baskets in and out of rotational insert |
| 9 | Basket receiving area |
| 10,' | Bottom, Top |
| 11,' | First, Second ends |
| 12,' | Bottom actuators |
| 13,' | Side actuators |
| 14,' | Stationary platens, side |
| 15,' | Stationary platens, top |
| 16 | Basket |
| 17 | Actuator Expansion Lift - clamping action |
| 18 | Actuator Expansion Lift - side position |
| 19 | Engaging fixed platen |
| 20 | |
| 21,' | Basket side, ends |
| 22,' | Basket bottom, top |
| 23,' | Clearance horizontal |
| 24 | Vertical clearance |
| 25 | diagonal |
| 27 | bladder |
| 28 | upper platen |
| 29 | lower platen |
| 30 | Actuator detail |
| 31 | Length |
| 32,' | First, second ends |
| 33 | Bladder upper support surface |
| 34,' | First, second edges |
| 35,' | First, second lateral walls at right angle forming compartment |
| 36 | underside |
| 37 | width |
| 48 | Bias pin aperture |
| 49 | Laid over |
| 50 | Envelope |
| 51 | Compartment hose/bladder |
| 52 | bladder |
| 53 | fluid impermeable, flexible wall |
| 54 | length |
| 55 | fluid receiving enclosure |
| 56,' | selectively fill, empty |
| 57 | bladder compartment, (variable height) |
| 60,' | lower platen sidewalls |
| 61 | support surface |
| 62 | bias apparatus to urge platens together to evacuate bladder |
| 63 | spring |
| 64,' | first, second ends |
| 65 | spring enclosure |
| 66 | spring compartment |
| 67,',"  | face, first, second sidewalls |
| 68,' | bias pin slots |
| 69 | length |
| 70 | vertically slide |
| 71 | base |
| 72,' | couplings |
| 73,' | aligned |
| 80 | pin |
| 81,' | first, second ends |

-continued

ELEMENTS of the Invention

| Element | Description |
| --- | --- |
| 82 | emanates past spring enclosure |
| 85 | aperture at locking position |
| 86 | compress spring to release bias between platens |
| 87 | locking pin |
| 88 | length |
| 90 | pressure rail |

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A retort, comprising:
    a vessel;
    a frame situated within the vessel having first and second intersecting edges defining an article receiving area;
    a first actuator associated with the first edge, the first actuator having an expanded configuration for engaging an article to secure the article within the article receiving area and a collapsed configuration; and
    a second actuator associated with the second edge, the second actuator having an expanded configuration for engaging the article to secure the article within the article receiving area and a collapsed configuration;
    wherein the article is secured within the article receiving area by expanding the first actuator to move the article in a first direction and expanding the second actuator to move the article in a second direction different from the first direction.

2. The retort of claim 1, wherein the first direction is substantially perpendicular to the second direction.

3. The retort of claim 1, wherein the frame has third and fourth intersecting edges defining the article receiving area.

4. The retort of claim 3 further comprising at least one stationary plate associated with each of the third and fourth edges such that when at least one of the first actuator and the second actuators is expanded, the article is urged against the at least one stationary plate.

5. The retort of claim 1, wherein the first actuator comprises
    first and second longitudinally aligned plates each having a first side facing and exposed to the article receiving area and a second side facing away from the article receiving area; and
    a single elongated bladder located to the second side of the first and second plates, the bladder being expandable upon receiving a fluid under pressure to expand the first actuator and collapsible upon draining the fluid.

6. The retort of claim 5, wherein the second actuator comprises:
    third and fourth longitudinally aligned plates each having a first side facing and exposed to the article receiving area and a second side facing away from the article receiving area; and
    a single elongated bladder located to the second side of the third and fourth plates, the bladder being expandable upon receiving a fluid under pressure to expand the second actuator and collapsible upon draining the fluid.

7. A method for securing and releasing an article within a retort, the method comprising:
    providing a first plate aligned longitudinally with a second plate, each first and second plate having a first side facing and exposed to an article receiving location of the retort and a second side facing away from the article receiving location, and a third plate located to the second side of the first and second plates;
    expanding a single elongated bladder located to the second side of the first and second plates and between the first and second plates and the third plate, thereby urging both the first and second plates away from the third plate to engage and secure the article within the retort; and
    collapsing the single elongated bladder to release the article within the retort, whereby a biasing force for urging the first and second plates and the fifth plate together upon venting fluid pressure from the bladder is provided by a biasing member.

8. The method of claim 7, further comprising
    providing a fourth plate longitudinally aligned with a fifth plate, each of the fourth plate and the fifth plate having a first side facing and exposed to an article receiving location of the retort and a second side facing away from the article receiving location; and
    expanding a second single elongated bladder located to the second side of the fourth and fifth plates thereby urging both the fourth and fifth plates to engage the article within the retort.

9. The method of claim 8, wherein the first plate and the second plate are longitudinally aligned along a first edge of a frame of the retort and wherein the fourth plate and fifth plate are longitudinally aligned along a second edge of the frame of the retort that intersects the first edge, the first and second edges defining at least part of the article receiving location.

10. In a retort, an actuator for securing an article within the retort, the actuator comprising:
    first and second longitudinally aligned plates each having a first side facing and exposed to an article receiving location of the retort and a second side facing away from the article receiving location;
    a single elongated bladder located to the second side of the first and second plates, the bladder being expandable upon receiving a fluid under pressure and collapsible upon venting the fluid, the bladder located to move both the first and second plates toward the article receiving location when the bladder expands so that the first and second plates will engage and secure the article within the retort;
    a third plate located to the second side of the first plate, the bladder located between the first and third plates to urge the first plate away from the third plate when the bladder expands; and
    a biasing member that provides a biasing force for urging the first plate and the third plate together upon venting fluid pressure from the bladder.

11. The actuator of claim 10, wherein the bladder permits both the first and second plates to move away from the article receiving location when the bladder collapses so that the article can be removed from the retort.

* * * * *